United States Patent [19]

Hubbard, Jr. et al.

[11] 4,311,047

[45] Jan. 19, 1982

[54] FLUID PRESENCE DETECTOR

[76] Inventors: Charlie J. Hubbard, Jr., 1906 48th St., Lubbock, Tex. 79412; Walter E. Granberry, Jr., 4811 14th St., Lubbock, Tex. 79416

[21] Appl. No.: 138,986

[22] Filed: Apr. 10, 1980

[51] Int. Cl.$^3$ .................................. G01F 1/68
[52] U.S. Cl. ...................................... 73/204; 73/151
[58] Field of Search ................. 73/151, 155, 204; 417/1, 12

[56] References Cited

U.S. PATENT DOCUMENTS

| | | | |
|---|---|---|---|
| 2,707,440 | 5/1955 | Long et al. ............... | 417/12 |
| 3,438,254 | 4/1969 | Seeley ..................... | 73/204 |
| 3,570,310 | 3/1971 | Densmore ................ | 73/204 |

OTHER PUBLICATIONS

Westerman, G. W., Successful Application . . . Controllers, SPE paper 6853 of AIME, Denver, Colorado, Oct. 1977.

*Primary Examiner*—Jerry W. Myracle
*Attorney, Agent, or Firm*—Kanz & Timmons

[57] ABSTRACT

The present invention detects the presence of liquid and it is used to control pumping of a well when the quantity of liquid being discharged by the pump per stroke is much less than the volumetric displacement of the pump.

A fluid detector (96) includes a first thermally conducting body (98), a first heater (100), a first temperature detector (108), insulation material (122, 124 and 136) for thermally insulating the first thermally conducting body, a second thermally conducting body (102) exposed to the inside of a conduit (104), a second heater (106) for heating the second thermally conducting body and a second temperature detector (110) for detecting the temperature of the second thermally conducting body or the second heater. One arrangement also includes an electrical bridge network (112) for comparing the relative rates of heat loss from the two thermally conducting bodies.

In one arrangement, a first positive temperature coefficient thermistor forms the first heater and the first temperature detector, and a second positive temperature coefficient thermistor forms the second heater and the second temperature detector.

In one arrangement, part of the insulation material forms a cylinder encircling the first thermally conducting body, the first heater, the second heater and part of the second thermally conducting body. The cylinder extends into the conduit and the second thermally conducting body extends out of the cylinder so that it is exposed to the inside of the conduit.

4 Claims, 8 Drawing Figures

FLUID PRESENCE DETECTOR

TECHNICAL FIELD

The present invention relates generally to fluid detectors and, in one of its aspects, to a method for detecting oil well pumpoff and to an oil well pumping control unit.

A condition known as "pumpoff" occurs in a well when the quantity of liquid being discharged by the pump per stroke is much less than the volumetric displacement of the pump. If the pump continues to operate without a sufficient supply of liquid, the polished rod which transmits motion to the pump and its seals may overheat and be damaged or destroyed. Once pumpoff occurs, it is usually desirable to stop the pump to eliminate needless energy use and equipment wear. The pump may be started again after a sufficient time has passed to allow replenishment of the liquid column in the well annulus.

BACKGROUND ART

Several devices which control a pump power source in response to some property of the pumping system are commercially available. Each of the different control devices monitors either directly or indirectly the quantity of liquid being pumped and disconnects the pump power source whenever the liquid being pumped falls below a predetermined value.

One group of control devices uses flow sensors which incorporate impellers, paddles, or differential pressure devices to measure the liquid flow rate from the pump at the wellhead. Mechanical devices like these tend to fail in service because of corrosion, scale build up and blockage by debris.

Beam monitor and rod tension devices are also used. Strain gauges are attached to the pump jack beam and mechanical or electronic tension gauges known as "dynomometers" are attached to the pumping rod or its support members to determine the stress on the rodstring as a function of time. The shape of the stress versus time graph is related to the quantity of liquid lifted by the down hole pump.

Some of the control devices use sonic sounding devices. An acoustical impulse is propagated down the annular region between the tubing and well casing. The return echo is analyzed to determine the height of the liquid in the annulus. The height and rate of change of height of the liquid column is used to determine a suitable pumping cycle.

Some control units use temperature sensors to determine the temperature of the polished rod. When the flow of liquid from the wellhead begins to decrease, the polished rod is no longer adequately cooled and its temperature increases because of frictional heating. The rising temperature of the polished rod is detected and used as a control parameter.

Some control units determine the rate at which electrical energy is consumed by the pump power source since the amount of power used depends on the quantity of liquid being pumped.

DISCLOSURE OF INVENTION

A method according to the present invention determines the presence or absence of liquid at a location in the production tree where liquid is replaced by gas in the event of pumpoff. If liquid is not present for a predetermined time, then the pump is turned off.

A method for detecting well pumpoff according to the present invention includes heating an insulated body at a location in the production tree where liquid is replaced by gas in the event of pumpoff, heating a body which is less insulated than an insulated body but in near proximaty to the insulated body, determining the relative rates of heat loss from the two bodies when liquid is present at the location and determining if the relative rate of heat loss from the two bodies is different from the relative rate of heat loss when liquid is present at the location.

An apparatus according to the present invention for detecting the presence of fluid flowing in the conduit includes a first thermally conducting body for placement inside the conduit, a first heater for heating the first thermally conducting body, means for thermally insulating the first thermally conducting body, a second thermally conducting body for exposing to the inside of the conduit and any liquids flowing therein, a second heater for heating the second thermally conducting body and means for comparing the relative rates of heat loss from the first thermally conducting body and the second thermally conducting body.

A preferred form of an apparatus according to the present invention includes a first thermally and electrically conducting body for placement inside the conduit, a first positive temperature coefficient thermistor having a first terminal and a second terminal, means for thermally insulating the first thermally conducting body and the first thermistor, a second thermally and electrically conducting body for exposing to the inside of the conduit, a second positive temperature coefficient thermistor having a first terminal and a second terminal, and means for comparing the relative electrical resistance of the first thermistor and the second thermistor. The relative resistance of the two thermistors when fluid is flowing across the exposed second thermally and electrically conducting body is measurably different from when the fluid is not flowing across the exposed second thermally and electrically conducting body. The first terminal to the first thermistor is affixed to and electrically connected to the first thermally and electrically conducting body, and the first terminal of the second thermistor is affixed to and electrically connected to the second thermally and electrically conducting body. One means for comparing the relative electrical resistance of the two thermistors includes an electrical bridge network having an input port and an output port, means for electrically connecting the first thermistor into the electrical bridge network, and means for electrically connecting the second thermistor into the electrical bridge network. The electrical bridge network can be adjusted to have a predetermined voltage value obtained from the output when power is supplied to the input and fluid is flowing in the conduit across the second thermally conducting body and a voltage measurably different from the predetermined voltage value obtained from the output when power is applied to the input and fluid is not flowing in the conduit across the second thermally conducting body.

A preferred form of the means for thermally insulating the first thermally conducting body includes a cylinder of low thermal conductivity encircling the first thermally conducting body, the first heater, the second heater, and part of the second thermally conducting body. The cylinder extends into the conduit and the second thermally conducting body extends out of the cylinder so that the second thermally conducting body is exposed to the inside of the conduit. Insulation materials separate the first thermally conducting body from the second thermally conducting body within the cylinder.

BRIEF DESCRIPTION OF DRAWINGS

These and other objects, advantages and features of this invention will be apparent from the following description taken with reference to the accompanying drawings, wherein is shown the preferred embodiments of the invention.

BEST MODE FOR CARRYING OUT THE INVENTION

Figure 1:
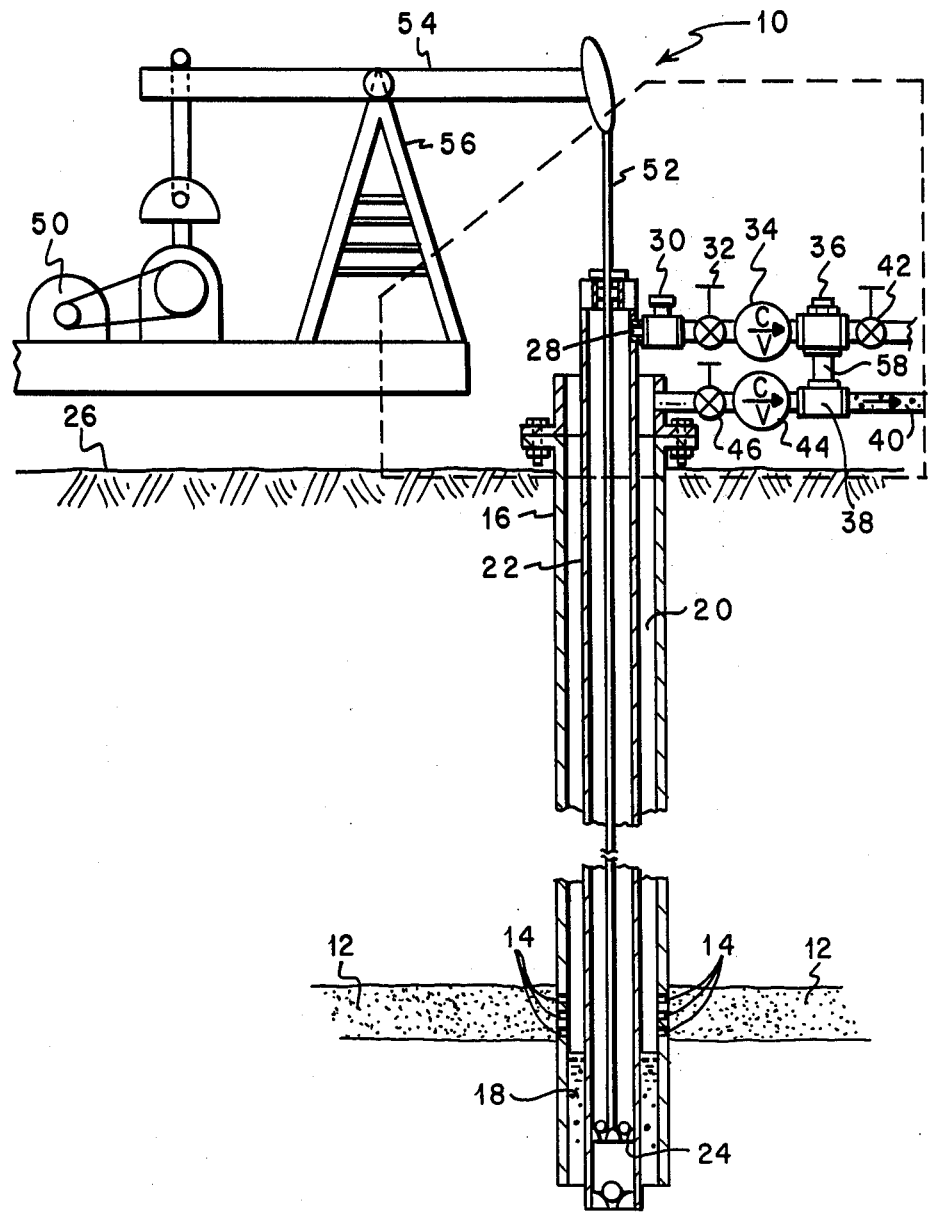
FIG. 1 is a pictorial representation of a pump produced oil well and a control apparatus according to the present invention.

Referring now to the drawing, and in particular to FIG. 1, a pump produced oil well is referred to generally by reference numeral 10. Oil bearing liquid from an underground formation 12 flows into a well bore through perforations 14 and a casing 16, forming a liquid column 18 in the annular region 20 between casing 16 and tubing string 22. A pump 24 lifts the liquid through tubing string 22 to a ground surface 26 where it is discharged from a wellhead 28 through an apparatus 30 according to the present invention for detecting the presence of a fluid, a hand valve 32, a check vial 34, a three-way coupling 36 and a lower three-way coupling 38 to flow output 40. The remaining output of three-way coupling 36 is normally blocked by a closed hand valve 42, and the remaining output of lower three-way coupling 38 is blocked by a check valve 44. A hand valve 46 can also shut the remaining outlet from lower three-way coupling 38. The fluid flow path from wellhead 28 to flow output 40 forms a production tree 48. Pump 24 is operated by pump power source 50 through polished rod 52 and beam 54 which is pivotally supported by samson post 56.

When liquid column 18 is high enough to fully charge pump 24 for each pump stroke, then liquid is present in both apparatus 30 and in three-way coupling 36. In the event that the pumping rate exceeds the capacity of oil bearing formation 12 to supply the well bore with liquid, the height of liquid column 18 will decrease with time. Eventually, pump 24 will no longer be immersed in liquid and the pumping rate will fall off, a condition known as "pumpoff." At this time, gases present in the liquid and vented from the casing will collect in three-way coupling 36. The presence of gas in three-way coupling 36 and a vertical member 58 connecting three-way coupling 36 with lower three-way coupling 38, is an early indication of pumpoff. If pump 24 continues to operate without a sufficient supply of liquid, a gas column will also develop in apparatus 30. If this occurs, polished rod 52 and its seals may overheat and be damaged or destroyed. Once pumpoff occurs, the apparatus of the present invention causes pump 24 to stop in order to eliminate needless energy use and equipment wear. Pump 24 may be started again after sufficient time has passed to allow replenishment of liquid column 18 in well annulus 20.

Figure 2:
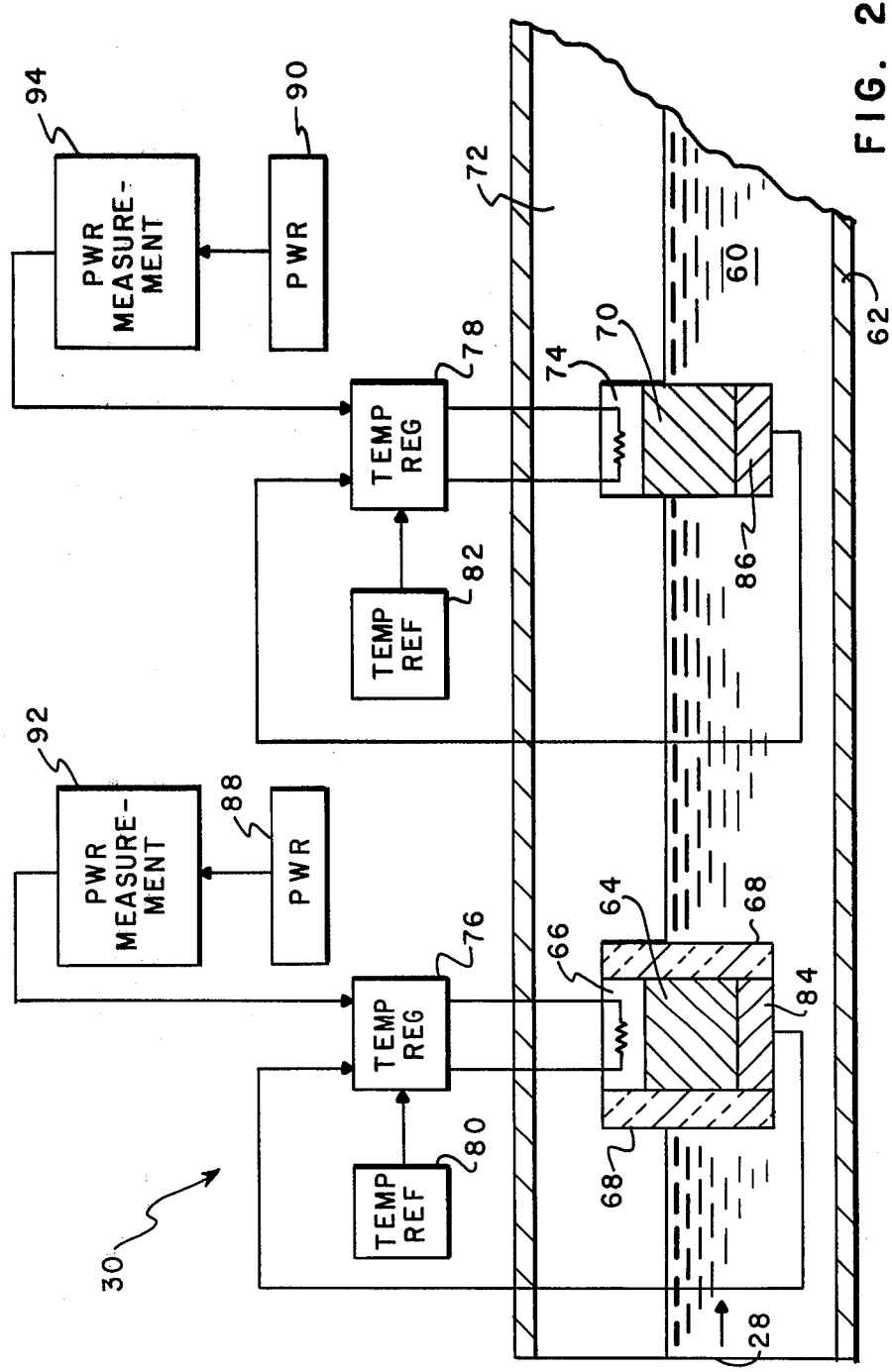
FIG. 2 is a schematic representation of one embodiment of an apparatus according to the present invention for detecting the presence of a fluid flowing in a conduit.

Referring now to FIG. 2, one arrangement of an apparatus 30 according to the present invention for detecting the presence of a fluid 60 flowing in a conduit 62 includes a first thermally conducting body 64 for placement inside conduit 62, a first heater 66 for heating first thermally conducting body 64, means 68 for thermally insulating first thermally conducting body 64, a second thermally conducting body 70 for exposing to the inside 72 of conduit 62, and a second heater 74 for heating second thermally conducting body 70. Apparatus 30 also includes means comprising temperature regulators 76 and 78 and temperature references 80 and 82 for comparing the relative rate of heat loss from first thermally conducting body 64 and second thermally conducting body 70. The temperature of first and second thermally conducting bodies 64 and 70 are measured by temperature measuring devices 84 and 86 respectively. The temperatures measured from temperature measuring devices 84 and 86 are compared to predetermined reference temperatures from temperature references 80 and 82 respectively, and since the referenced temperatures are predetermined, the temperature of first and second thermally conducting bodies 64 and 70 are compared indirectly to each other so that the relative rates of heat loss from the two bodies are known. The process can be further monitored by measuring the total power input from power sources 88 and 90 by means of power measurement devices 92 and 94 respectively.

Figure 3:
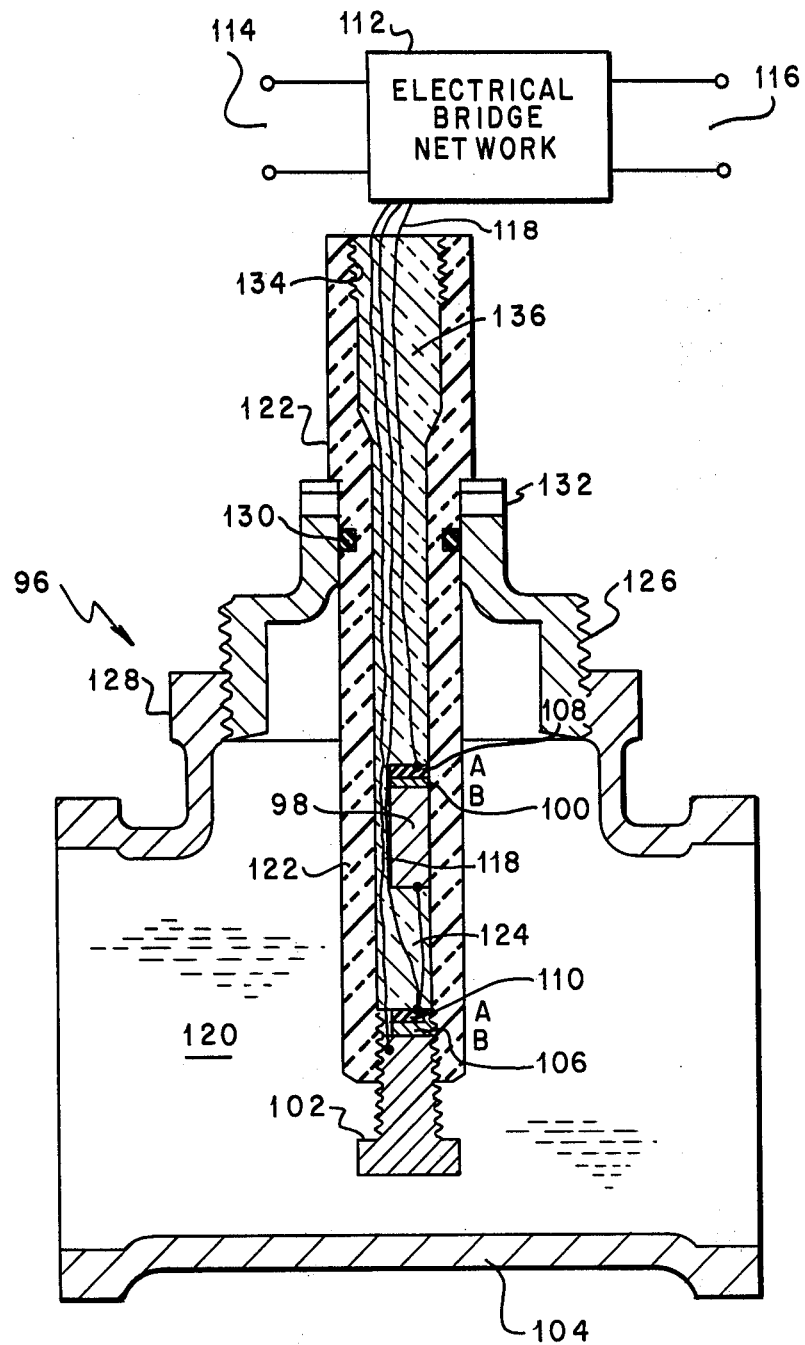
FIG. 3 is a cross-sectional view in elevation of an apparatus according to the present invention.

Referring now to FIG. 3, a preferred embodiment of an apparatus according to the present invention is referred to generally by reference numeral 96. Apparatus 96 includes a first thermally conducting body 98, a first heater 100 for heating first thermally conducting body 98, a second thermally conducting body 102 for exposing to the inside of conduit 104, and a second heater 106 for heating second thermally conducting body 102. Means for comparing the relative rates of heat loss from first thermally conducting body 98 and second thermally conducting body 102 includes first temperature detector 108 and second temperature detector 110 thermally connected to first heater 106 and second heater 100 respectively, although the temperature detectors could be thermally connected directly to their respective thermally conducting bodies in another arrangement. Comparing means also includes an electrical bridge network 112 having an input port 114 and an output port 116, and means 118 for electrically connecting first temperature detector 108 and second temperature detector 110 into the electrical bridge network. Electrical bridge network 112 can be adjusted to have a predetermined value of voltage obtained from output port 116 when power is applied to input port 114 and fluid 120 is flowing in conduit 104 across second thermally conducting body 102. A voltage measurably different from the predetermined voltage value is obtained from the output port when power is supplied to the input port and fluid is not flowing in the conduit across the second thermally conducting body. Normally, the voltage at output port 116 of electrical bridge network 112 can simply be zeroed by an adjustment when liquid 120 is known to be flowing in conduit 104 so that any non-zero voltage at output 116 will indicate a lack of fluid in the conduit.

Apparatus 96 also includes means for thermally insulating first thermally conducting body 98, comprising a cylinder 122 of low thermal conductivity such as a low thermal conductivity polymer encircling first thermally conducting body 98, a first heater 100, second heater 106 and part of second thermally conducting body 102. Cylinder 122 extends into conduit 104 and second thermally conducting body 102 extends out of cylinder 122 so that second thermally conducting body 102 is exposed to the inside of conduit 104. Insulation material 124 separates first thermally conducting body 98 from second thermally conducting body 102. Cylinder 122 is supported by a metal plug 126 which in turn is supported by a cast iron pipe T 128 which forms the particular section of conduit 104. An "o" ring 130 and a roll pin 132 seal the connection between cylinder 122 and metal plug 126. Cylinder 122 forms inside threads 134 for connection to additional hardware. Additional insulation material 136 further insulates the contents of cylinder 122.

Figure 4:
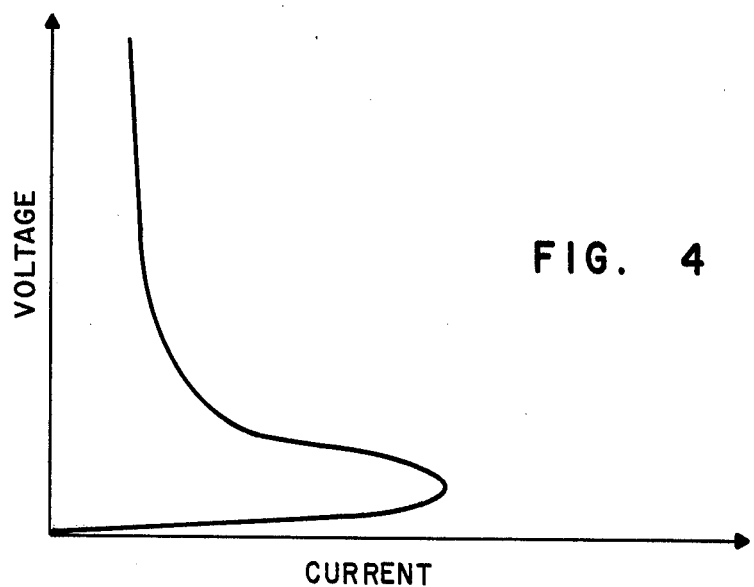
FIG. 4 is a graph representing voltage as a function of current for a positive temperature coefficient thermistor.
Figure 5:
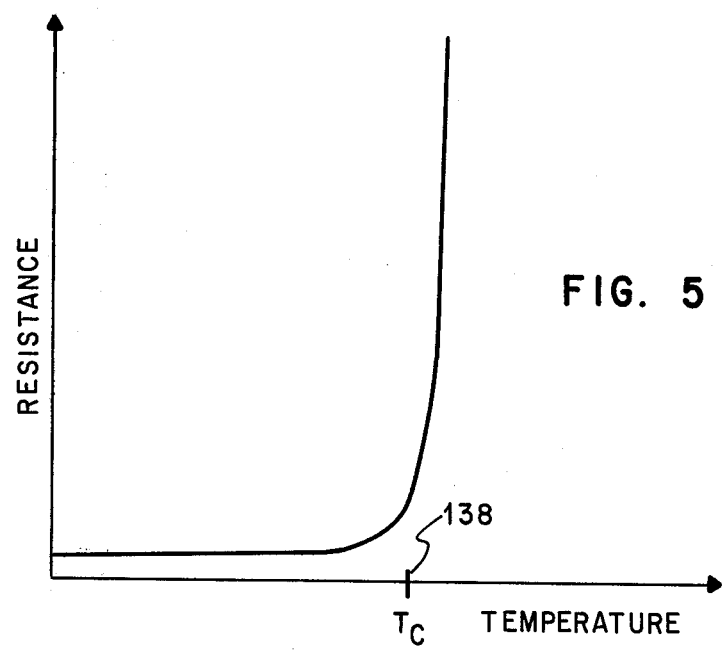
FIG. 5 is a graph representing resistance as a function of temperature for a positive temperature coefficient thermistor.

In a preferred embodiment, a first positive temperature coefficient thermistor comprises first heater 100 and first temperature detector 108, and a second positive temperature coefficient thermistor comprises second heater 106 and second temperature detector 110. Referring also to FIG. 4 and FIG. 5, the electrical characteristics of a positive temperature coefficient thermistor is such that if the thermistor is excited by a constant voltage source, joule heating will increase the temperature of the thermistor and therefore increase its resistance until the electric power supplied to the thermistor and the rate of heat loss are in equilibrium. The equilibrium thermistor temperature is approximately the Curie temperature $T_c$ 138. The device temperature in this case is self-regulating provided that the heat loss is small enough that the available power input into the device is sufficient to maintain a temperature near $T_c$ 138.

In comparing the heat losses from an uninsulated body and an insulated body maintained at a substantially constant temperature, the present invention determines whether heat is being lost to a gas or to a liquid. If the positive temperature coefficient thermistors are maintained at a constant voltage and conditions are such that a temperature near the Curie temperature is being held, it is sufficient to compare the currents through the positive temperature coefficient thermistors which heat the insulated and unsulated bodies, first thermally conducting body 98 and second thermally conducting body 102 respectively.

Figure 6:
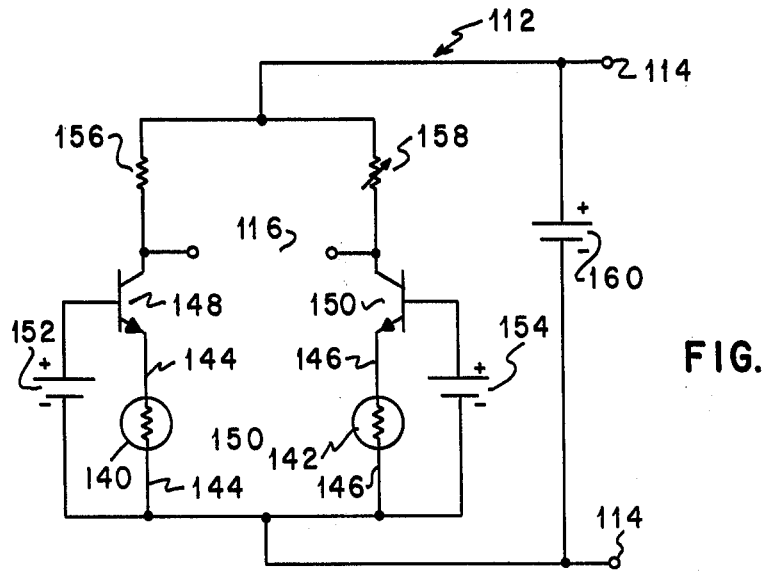
FIG. 6 is a schematic diagram of an electrical bridge for use in one embodiment of the present invention.

Referring now to FIG. 6, electrical bridge network 112 compares the relative electrical resistance of a first positive temperature coefficient thermistor 140 and a second positive temperature coefficient thermistor 142. The relative resistance of the two thermistors when fluid is flowing across exposed second thermally conducting body 102 is measurably different from when fluid is not flowing across the exposed second thermally conducting body. Means 118 for electrically connecting the thermistors to electrical bridge network 112 comprises means 144 for electrically connecting first thermistor 140 into electrical bridge network 112 and means 146 for electrically connecting second thermistor 142 into electrical bridge network 112. Electrical bridge network 112 also includes first transistor 148 and second transistor 150 for driving first and second thermistors 140 and 142 respectively through their emitters. The base connections are to substantially equal voltage supplies 152 and 154 respectively. The collectors of the transistors are connected through resistor 156 and variable resistor 158 respectively to power supply 160 connected at input 114. Electrical bridgework 112 can be adjusted by means of variable resistor 158 to have a predetermined value of voltage obtained from output port 116, preferably zero volts, when power is applied to input port 114 and fluid 120 is flowing in conduit 104 across second thermally conducting body 102. A voltage measurably different from the predetermined voltage value is obtained from output port 116 when power is applied to input port 114 and fluid is not flowing in the conduit across the second thermally conducting body.

Figure 7:
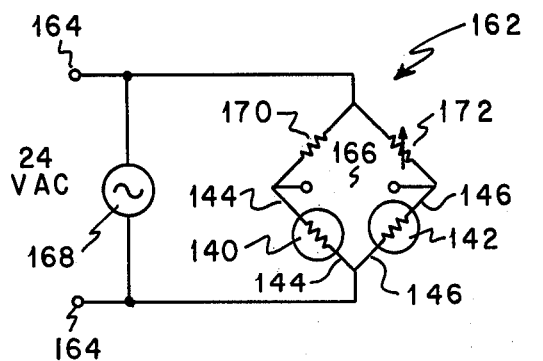
FIG. 7 is an alternative embodiment of an electrical bridge for use in the present invention.

Referring now to FIG. 7, a simpler embodiment of the electrical bridge network is referred to generally by reference numeral 162, and it includes input port 164 and output port 166. Power supply 168 applies a 24 volt alternating current to input port 164 which is connected to a bridge made up of first thermistor 140, second thermistor 142, resistor 170 and variable resistor 172. Again, the voltage at output port 166 can be zeroed by adjusting variable resistor 172 when fluid is known to be flowing in the conduit.

Figure 8:
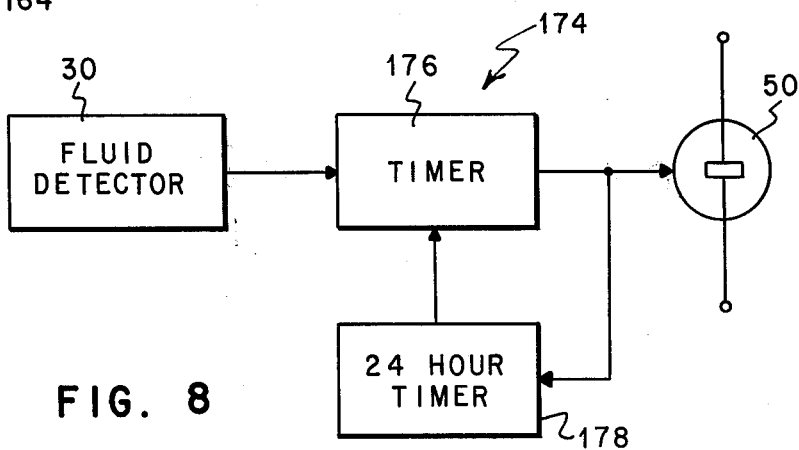
FIG. 8 is a control diagram showing the operation of a control unit according to the present invention.

Referring now to FIG. 8, a control system according to the present invention for a well pump is referred to generally by reference numeral 174. Control system 174 includes apparatus 30 which is a fluid detector. Fluid detector apparatus 30 starts a timer 176 if liquid is not present at fluid detector 30. Fluid detector 30 is located in the production tree at a location where liquid is replaced by gas in the event of pumpoff. If liquid returns to the location during a predetermined time set by timer 176, then timer 176 is shut off so that pump power source 50 continues to operate the pump. If, on the other hand, liquid does not return to the location of fluid detector 30 during the predetermined time, which would typically be in the order of three to five minutes, then timer 176 stops the pump by turning off pump power source 50. Timer 176 also then starts a timer for a longer period such as a 24 hour timer 178. At the end of the predetermined time of 24 hour timer 178, the 24 hour timer disables timer 176 by setting it back to zero, starting pump power source 50. In this way, if enough liquid has built up during the 24 hour period for pumping, then the pump can operate until pumpoff again occurs.

Because the presence or absence of liquid at a particular location is a gross condition which is easily detected, a control system according to the present invention may be implemented more reliably and less expensively than by other means.

An apparatus according to the present invention should have a long service life with little maintenance. It is simple and rugged, containing no moving parts, and is compatable with most corrosive substances containing sand, rocks, scale, paraffin, and other debris. In addition, the apparatus is relatively insensitive to large variations in ambient temperatures.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and within the scope of the claims.

As many possible embodiments may be made of the invention without departing from the scope thereof, it is to understood that all matter herein set forth or shown in the accompanying drawings is to be interpreted as illustrative and not in a limiting sense.

I claim:

1. An apparatus for detecting the presence of a fluid flowing in a conduit, comprising in combination:
    a first thermally conducting body for placement inside the conduit;
    a first heater for heating the first thermally conducting body;
    a second thermally conducting body for exposing to the inside of the conduit;
    a second heater for heating the second thermally conducting body;
    a cylinder of low thermal conductivity encircling the first thermally conducting body, the first heater, the second heater, and part of the second thermally conducting body, wherein the cylinder extends into the conduit and the second thermally conducting body extends out of the cylinder whereby the second thermally conducting body is exposed to the inside of the conduit;
    insulation material separating the first thermally conducting body from the second thermally conducting body; and
    means for comparing the relative rates of heat loss from the first thermally conducting body and the second thermally conducting body.

2. An apparatus for detecting the presence of a fluid flowing in a conduit, comprising in combination:
    a first thermally conducting body for placement inside the conduit;
    a first positive temperature coefficient thermistor thermally coupled to the first thermally conducting body;
    a second thermally conducting body for exposing to the inside of the conduit;
    a second positive temperature coefficient thermistor thermally coupled to the second thermally conducting body;
    a cylinder of low thermal conductivity encircling the first thermally conducting body, the first thermistor, the second thermistor and part of the second thermally conducting body, wherein the cylinder extends into the conduit and the second thermally conducting body extends out of the cylinder whereby the second thermally conducting body is exposed to the inside of the conduit;
    insulation material separating the first thermally conducting body from the second thermally conducting body; and
    means for comparing the relative electrical resistance of the first thermistor and the second thermistor wherein the relative resistance of the two thermistors when fluid is flowing across the exposed second thermally conducting body is measurably different from when fluid is not flowing across the exposed second thermally conducting body.

3. An apparatus for detecting the presence of a fluid flowing in a conduit, comprising in combination:
    a first thermally and electrically conducting body for placement inside the conduit;
    a first positive temperature coefficient thermistor having a first terminal and a second terminal, wherein the first terminal is affixed to and electrically connected to the first thermally and electrically conducting body;
    means for thermally insulating the first thermally conducting body and the first thermistor;
    a second thermally and electrically conducting body for exposing to the inside of the conduit;
    a second positive temperature coefficient thermistor having a first terminal and a second terminal, wherein the first terminal is affixed to and electrically connected to the second thermally and electrically conducting body; and
    means for comparing the relative electrical resistance of the first thermistor and the second thermistor wherein the relative resistance of the two thermistors when fluid is flowing across the exposed second thermally and electrically conducting body is measurably different from when fluid is not flowing across the exposed second thermally and electrically conducting body.

4. An apparatus according to claim 3 wherein the means for comparing the relative electrical resistance of the first thermistor and the second thermistor comprises in combination:
    an electrical bridge network having an input port and an output port;
    means for electrically connecting the first thermistor into the electrical bridge network; and
    means for electrically connecting the second thermistor into the electrical bridge network wherein the electrical bridge network can be adjusted to have a predetermined value of voltage obtained from the output port when power is applied to the input port and fluid is flowing in the conduit across the second thermally conducting body and a voltage measurably different from the predetermined voltage value obtained from the output port when power is applied to the input port and fluid is not flowing in the conduit across the second thermally conducting body.

* * * * *